Aug. 15, 1950     E. L. RICHARDSON     2,518,999

ELECTROSTATIC PRECIPITATOR

Filed Aug. 30, 1947

INVENTOR
Earl L. Richardson
BY Robert J. Palmer
Attorney

Patented Aug. 15, 1950

2,518,999

UNITED STATES PATENT OFFICE 2,518,999

ELECTROSTATIC PRECIPITATOR

Earl L. Richardson, Hyde Park, Mass., assignor to Westinghouse Electric Corporation, East Pittsburgh, Pa., a corporation of Pennsylvania Application August 30, 1947, Serial No. 771,557

9 Claims. (Cl. 183—7)

This invention relates to electrostatic precipitators for the removal of foreign particles such as dust, from gases such as air.

A successful electrostatic precipitator for the removal of dust from air, is of the type disclosed in the G. W. Penney Patent No. 2,129,783 in which the air to be cleaned is first ionized in ionizing chambers for imparting electrostatic charges to the dust entrained therein, following which the air with the charged dust particles in passed into collector chambers in which the dust particles are deposited upon oppositely charged collector plates. It is necessary from time to time to remove the ionizer electrodes and the collector electrodes for cleaning, servicing or replacement, and in the prior constructions this has required considerable time and attention involving the disconnecting of the various components.

A feature of this invention is that the collector electrodes are mounted in a self-contained cell which is adapted to be mechanically plugged into a cell mounting which may be a rack formed from structural steel channel members.

Another feature of the invention is that the ionizer electrodes are supported in a self-contained assembly which is adapted to be plugged into the mounting into which the associated collector cell is placed.

In one embodiment of the invention, collector cell supporting tubes extend longitudinally from racks formed from vertically extending, structural columns, and the end plates of the collector cells are fitted into tubes which slide around the supporting tubes when the cells are moved horizontally into the racks. The ionizer electrode assembly is fitted with rods which slide into the tubes in the end plates of the collector cells when the ionizer assembly is moved horizontally into the racks following the placement of the collector cells. Such a construction is relatively simple and inexpensive; is adapted for mass production; permits quick and easy removal of individual collector cells; permits quick and easy removal of individual ionizer assemblies; and requires minimum area in the direction of flow of the gas to be cleaned.

An object of the invention is to simplify the construction of electrostatic precipitators.

Another object of the invention is to facilitate the removal of ionizer electrode assemblies from electrostatic precipitators.

Another object of the invention is to facilitate the removal of collector electrode assemblies from electrostatic precipitators.

Other objects of the invention are to reduce the cost of, and the space required by, electrostatic precipitators.

The invention will now be described with reference to the drawing, of which:

Figure 1:
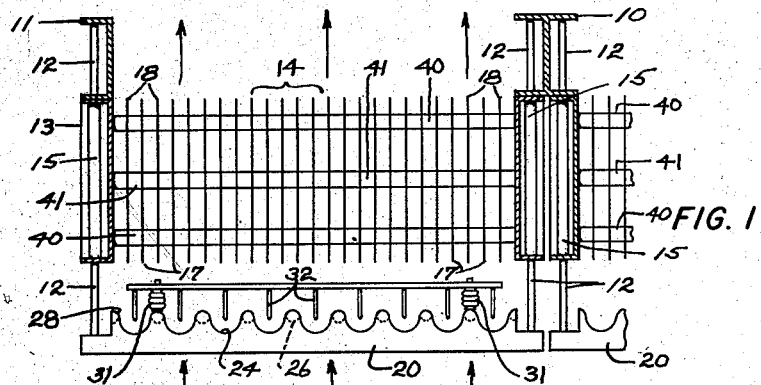
Fig. 1 is a partial plan view looking downwardly upon an electrostatic precipitator embodying this invention, with the collector cell end plates, and the supporting channel members shown in section.

The rack for the electrostatic precipitator illustrated, comprises the structural I-beam 10 and the structural channel member 11 spaced from one side thereof. The I-beam 10 and the channel member 11 form a rack for one row of collector cells with their associated ionizer electrode assemblies. Another channel member similar to the member 11 could be spaced from the other side of the I-beam 10 for providing therewith another rack for another row of collector cells and their associated ionizer electrode assemblies.

The collector cells 14, one of which is illustrated, comprise the end plates 13 having the flanged sides 16 with the tubes 15 extending therethrough. The grounded collector plates 17 are supported upon rods within the spacers 40, attached at their ends to the end plates 13, and the insulated collector plates 18 are supported upon rods within the spacers 41, attached at their ends to the electric insulators 19 which are attached to the brackets 23. The rods supporting the grounded collector plates 17, and their spacers, pass through clearance holes in the insulated collector plates 18, and the rods supporting the insulated collector plates 18, and their spacers, pass through clearance openings in the grounded collector plates 17 and in the end plates 13. This construction is disclosed in detail in my copending application, Serial No. 757,785, filed June 28, 1947.

The I-beam 10 and the channel member 11 have the cylindrical tubes 12 extending longitudinally therefrom, and each end plate 13 of each collector cell 14, has extending through its flanged sides 16, a tube 15 having an inner diameter slightly larger than that of one of the tubes 12. The cells 14 are mounted in the rack by lining up its tubes 15 with the corresponding tubes 12 of the rack, and by pushing the cells inwardly so as to slide the tubes 15 over the corresponding tubes 12.

Figures 2, 3:
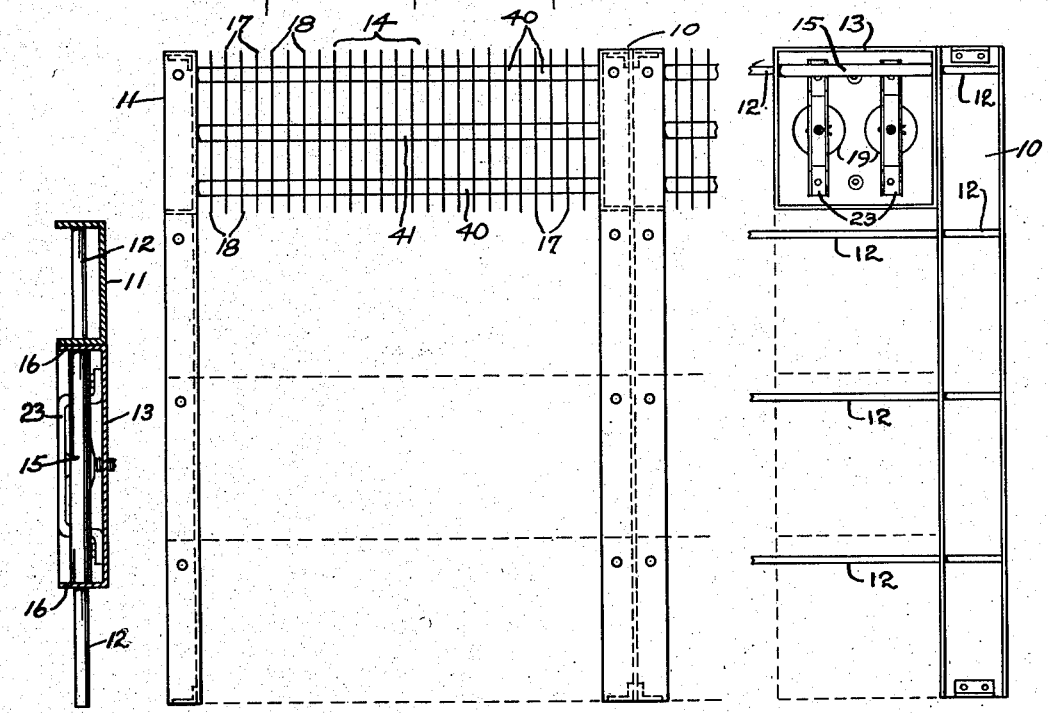
Fig. 2 is a partial side elevation of the supporting rack for the collector cells and their associated ionizer electrodes, and shows one collector cell in position.
Fig. 3 is an end elevation of the rack and collector cell of Fig. 2.
Figures 4, 5:
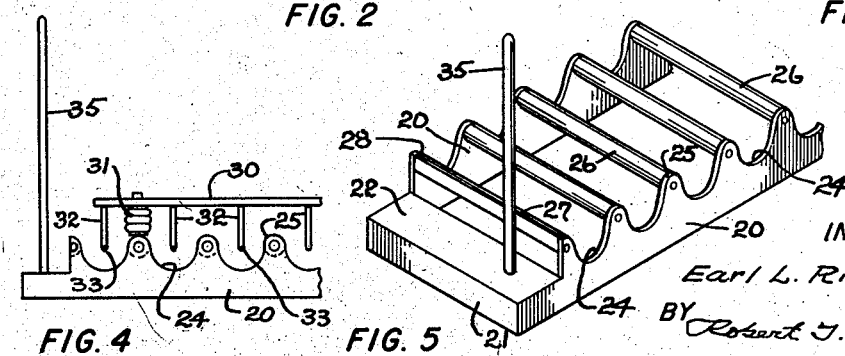
Fig. 4 is an enlarged plan view of a portion of one of the ionizer electrode assemblies, and illustrates one of its support rods in alignment with a supporting tube carried by a collector cell end plate, and a supporting tube carried by a supporting rack channel member.
Fig. 5 is an enlarged, partial, projected view of one of the ionizer electrode assemblies.

The rack illustrated by Figs. 2 and 3 shows one cell 14 in the uppermost cell row of the rack. The horizontal dashed lines illustrate the outlines of the spaces that may be occupied by three lower cells. The rack could, of course, have more or fewer rows of cells depending upon the height of collection chamber required.

Figs. 1 and 2 illustrate a portion of another cell 14, extending to the right facing the drawing, of the I-beam 10. This cell would be supported in another rack similar to that described in the foregoing. As many such racks as the capacity of the collected chamber requires, may be provided.

The ionizer electrode assembly illustrated, comprises the spaced plates 20 which are interconnected at their ends by the plates 21 and 22. Each plate 20 has the semi-circular openings 24 aligned with similar openings in the other plate 20, and has the semi-circular edges 25 formed between the openings 24. The tubular ionizer electrodes 26 having the same diameters as the edges 25 are aligned therewith and extend between and interconnect the plates 20. The plates 20 adjacent the end plates 22 have the semi-circular, tubular electrodes 27 extending therebetween with the curved edges 28 aligned with the electrodes 27. The bars 30 are supported by the tubular insulators 31 from the end electrodes 26, and have the arms 32 extending to the centers of the openings 24. The ionizer wires 33 are supported by the arms 32 midway between the tubular ionizer electrodes.

The plates 22 at the ends of the ionizer electrode assembly, have the rods 35 extending perpendicular thereto, and which have a slightly smaller diameter than that of the tubes 12. For assembling the ionizer electrode assembly in the rack, the rods 35 are aligned with the corresponding tubes 12, and the assembly is pushed towards the rack so that the rods 35 slide into the tubes 12. The tubes 12 have portions which extend outwardly from the rack beyond the space occupied by the collector cell 14, and which by contacting the plates 22 of the ionizer electrode assembly, limit the movement of same towards the rack thus spacing the ionizer electrodes the correct distances from the collector electrodes.

Each collector cell has its individual ionizer electrode assembly, which can easily be removed from the rack by sliding it outwardly, following which the associated collector cell can easily be removed by sliding it outwardly from the rack.

The end plates 13 of the collector cell 14, which are grounded to the collector plates 17 and to the I-beam 10 and the channel members 11, are adapted to be connected to the negative terminal of a suitable, high voltage, direct current supply source; the insulated collector plates 18 are adapted to be connected to a terminal of the said source, which may be at a potential of +6,000 volts, and the ionizer wires 33 are adapted to be connected to a terminal of said source, which may be at a potential of +12,000 volts. The tubular ionizer electrodes are grounded through the rods 35 and the tubes 12 to the rack, and therefore are connected electrically to the negative terminal of the supply source.

In operation, the dust and other foreign particles entrained in the gas passing between the ionizer electrodes, are given positive electrostatic charges which cause them to be attracted to and deposited upon the grounded collector plates as described in detail in said Penney patent.

While one embodiment of the invention has been described for the purpose of illustration, it should be understood that the invention is not limited to the exact apparatus and arrangement of apparatus illustrated, as modifications thereof may be suggested by those skilled in the art, without departure from the essence of the invention.

What is claimed is:

1. An electrostatic precipitator comprising a vertical supporting rack, a collector cell having end walls, and a plurality of supporting members extending outwardly from said rack perpendicular thereto and supporting said cell, said walls having perpendicular extensions with openings therein through which said members extend.

2. An electrostatic precipitator comprising a vertical supporting rack, a collector cell having end walls with flanged sides extending outwardly therefrom perpendicular thereto, and a plurality of supporting members extending outwardly from said rack perpendicular thereto and supporting said cell, said flanged sides having openings therein through which said members extend.

3. An electrostatic precipitator comprising a vertical supporting rack, a collector cell having end walls with flanged sides extending outwardly therefrom perpendicular thereto, a plurality of members extending outwardly from said rack perpendicular thereto, and tubes extending between opposite of said flanged sides around said members.

4. An electrostatic precipitator comprising a vertical supporting rack, an ionizer electrode supporting frame, members extending outwardly from said rack perpendicular thereto for supporting said frame, and members on said frame slidably fitted to said members.

5. An electrostatic precipitator comprising a vertical supporting rack, an ionizer electrode supporting frame, tubes extending outwardly from said rack perpendicular thereto for supporting said frame, and members attached to said frame and slidably fitted into said tubes.

6. An electrostatic precipitator comprising a vertical supporting rack, a collector cell having end walls, members extending outwardly from said rack perpendicular thereto, said end walls having perpendicular extensions with openings therein through which said members extend, an ionizer electrode supporting frame, and members attached to said frame and slidably fitted into said first mentioned members.

7. An electrostatic precipitator as claimed in claim 6, in which the extensions of the walls are flanged sides, opposite of which have openings through which the first mentioned members extend.

8. An electrostatic precipitator as claimed in claim 7, in which members extend between the opposite flanged sides around the first mentioned members.

9. An electrostatic precipitator as claimed in claim 6, in which the extensions of the walls are flanged sides, opposite of which have openings interconnected by members extending around the first mentioned members, and the ionizer electrode supporting frame has members attached thereto which fit slidably into the first mentioned members.

EARL L. RICHARDSON.

REFERENCES CITED

The following references are of record in the file of this patent:

UNITED STATES PATENTS

| Number | Name | Date |
| --- | --- | --- |
| 1,297,378 | McNear et al. | Mar. 18, 1918 |
| 2,380,992 | Pegg et al. | Aug. 7, 1945 |